United States Patent
Nakayama

(10) Patent No.: US 7,532,912 B2
(45) Date of Patent: May 12, 2009

(54) MOBILE RADIO DEVICE HAVING MOVABLE POINTER ON DISPLAY SCREEN

(75) Inventor: Akira Nakayama, Tokyo (JP)

(73) Assignee: NEC Corporation, Tokyo (JP)

( * ) Notice: Subject to any disclaimer, the term of this patent is extended or adjusted under 35 U.S.C. 154(b) by 403 days.

(21) Appl. No.: 10/396,325

(22) Filed: Mar. 26, 2003

(65) Prior Publication Data

US 2004/0204141 A1   Oct. 14, 2004

(30) Foreign Application Priority Data

Mar. 27, 2002   (JP)   .............................. 2002-087432

(51) Int. Cl.
*H04M 1/00* (2006.01)
*H04B 1/38* (2006.01)

(52) U.S. Cl. ...................... 455/566; 455/563; 455/564; 455/156.1; 455/154.1; 455/157.2; 455/158.4; 345/156; 345/157; 345/158; 345/162; 345/169; 345/170; 345/171; 345/172

(58) Field of Classification Search ......... 455/566–567, 455/154.1, 156.1, 158.4–5, 563–565, 157.2; 345/156–178
See application file for complete search history.

(56) References Cited

U.S. PATENT DOCUMENTS

| | | | | |
|---|---|---|---|---|
| 6,046,722 A * | 4/2000 | McKiel, Jr. | ................. | 715/862 |
| 6,047,197 A * | 4/2000 | Jarrad | ........................ | 455/566 |
| 6,243,080 B1 * | 6/2001 | Molne | ........................ | 345/173 |
| 6,532,005 B1 * | 3/2003 | Campbell | ................... | 345/173 |
| 6,559,872 B1 * | 5/2003 | Lehikoinen et al. | ......... | 715/856 |
| 6,720,980 B1 * | 4/2004 | Lui et al. | .................... | 715/728 |
| 6,917,822 B1 * | 7/2005 | Mori et al. | .................. | 455/564 |
| 7,013,281 B2 * | 3/2006 | Henrie et al. | ............ | 704/270.1 |
| 7,058,432 B2 * | 6/2006 | Nishimoto | ............... | 455/575.1 |
| 2002/0084982 A1 * | 7/2002 | Rosenberg | .................. | 345/157 |
| 2002/0163543 A1 | 11/2002 | Oshikiri | | |
| 2003/0013483 A1 * | 1/2003 | Ausems et al. | .............. | 455/556 |

FOREIGN PATENT DOCUMENTS

| | | | |
|---|---|---|---|
| JP | 3-125214 A | | 5/1991 |
| JP | 07160468 | * | 6/1995 |
| JP | 7-168691 A | | 7/1995 |
| JP | 08-076919 A | | 3/1996 |
| JP | 10-91320 A | | 4/1998 |
| JP | 2001-189792 A | | 7/2001 |
| JP | 2001-230845 A | | 8/2001 |

* cited by examiner

*Primary Examiner*—Tuan A Tran
(74) *Attorney, Agent, or Firm*—Sughrue Mion, PLLC

(57) ABSTRACT

A mobile radio device improves its operability with a simple configuration and facilitates the pointing operation of a pointer displayed on a screen to a desired area. First apparatus displays a first area, a second area, and a pointer on a screen. The second area is partitioned by a boundary and located outside the first area. The pointer is movable on the screen according to a user's operation. Second apparatus acquires position information of the pointer on the screen. Third apparatus sets positional information of the first area and the second area. Fourth apparatus notifies with vibration, sound, and/or light the user a fact that the pointer is moved on the screen across the boundary between the first area and the second area based on the position information of the pointer acquired by the second apparatus and the positional information of the first area and the second area set by the third apparatus.

14 Claims, 7 Drawing Sheets

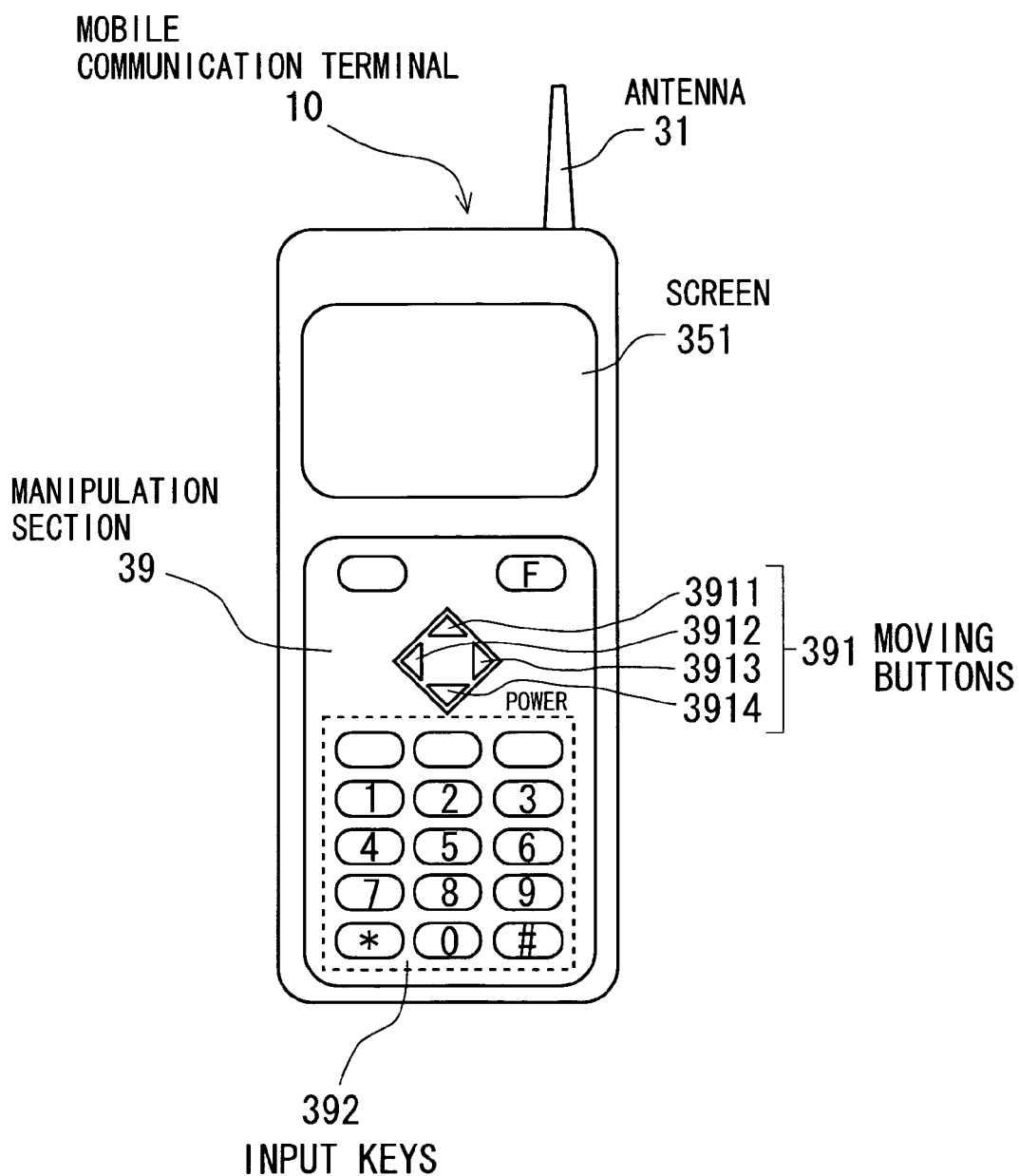

MOBILE RADIO DEVICE HAVING MOVABLE POINTER ON DISPLAY SCREEN

BACKGROUND OF THE INVENTION

1. Field of the Invention

The present invention relates to a portable or mobile radio device such as portable or cellular phones, portable information terminals, and so on. More particularly, the invention relates to a portable or mobile radio device having a pointer movably displayed on a screen.

2. Description of the Related Art

Recently, mobile communication devices or terminals such as cellular phones, which have a small display screen, have been used not only for telephone conversation but also for transmission and reception of e-mail messages and reading/viewing homepages or sites by accessing specific WWW (World Wide Web) servers on the Internet. On the display screen of the terminal of this type, action items or menu items are usually formed or displayed for the purpose of facilitating the choice of desired or required items, such as personal information (e.g., telephone directory), e-mail messages received or transmitted, and the character and/or graphic information obtained from the WWW servers on the Internet. If a user chooses one of the items displayed on the screen and instructs the terminal to execute a function or functions corresponding to the item thus chosen, the terminal will conduct the desired function or functions.

For example, when a user makes a telephone call with a mobile communication terminal of this type, the user operates the terminal in such a way that his/her telephone directory is displayed on the screen and then, a desired person and a corresponding telephone number are chosen from the listing of the directory using the pointer movably displayed on the screen. Thereafter, the user presses an execution button (i.e., a calling button). Thus, the user will be able to make a telephone call to the person the user has chosen this time.

Moreover, if the user moves the pointer to a desired one of the menu or action items on the screen and instructs the terminal to execute a function or functions corresponding to the item thus chosen, the user can open a window for creating an e-mail message and transmitting the same, or can brows other WWW servers or Internet sites as desired.

However, the above-described prior-art mobile communication terminals have the following problems.

Specifically, the display screen is small because the terminal itself is small-sized for mobility. The pointer is moved on the screen analogous to the operation of manipulation buttons. Therefore, it is difficult for the user to recognize the menu items displayed on the screen and to choose a desired one of the items with the sense of sight only. For example, it is not easy for the user to correctly choose a 2×2 dot area of the menu item on the screen with the pointer Moreover, if the user is poor in eyesight, the user is unable to manipulate the pointer as desired.

SUMMARY OF THE INVENTION

Accordingly, an object of the present invention is to provide a mobile radio device that improves its operability with a simple configuration.

Another object of the present invention is to provide a mobile radio device that facilitates the pointing operation of a pointer displayed on a screen to a desired area.

The above objects together with others not specifically mentioned will become clear to those skilled in the art from the following description.

A mobile radio device according to a first aspect of the present invention comprises:

first means for displaying a first area, a second area, and a pointer on a screen;

the second area being partitioned by a boundary and located outside the first area;

the pointer being movable on the screen according to a user's operation;

second means for acquiring position information of the pointer on the screen;

third means for setting positional information of the first area and the second area; and fourth means for notifying the user a fact that the pointer is moved on the screen across the boundary between the first area and the second area based on the position information of the pointer acquired by the second means and the positional information of the first area and the second area set by the third means.

With the mobile radio device according to the first aspect of the present invention, there are provided with second means for acquiring position information of the pointer on the screen and third means for setting positional information of the first area and the second area. Moreover, fourth means is provided for notifying the user a fact that the pointer is moved on the screen across the boundary between the first area and the second area based on the position information of the pointer acquired by the second means and the positional information of the first area and the second area set by the third means.

Therefore, the user can easily recognize whether the pointer is correctly located on the first area or not by the notification operation of the forth means. This means that the operability of the device is improved with a simple configuration and that the pointing operation of the pointer to a desired area on the screen is facilitated.

In a preferred embodiment of the device according to the first aspect of the invention, the fourth means notifies the user a fact that the pointer is moved from the second area to the first area across the boundary or a fact that the pointer is moved from the first area to the second area across the boundary.

In another preferred embodiment of the device according to the first aspect of the invention, the fourth means notifies the user a fact that the pointer is moved from the second area to the first area across the boundary and a fact that the pointer is moved from the first area to the second area across the boundary.

In still another preferred embodiment of the device according to the first aspect of the invention, when the pointer is moved from the second area to the first area across the boundary, the fourth means gives the user a notification that the pointer has been moved from the second area to the first area across the boundary. Moreover, the notification is continued until the pointer is moved from the first area to the second area across the boundary and is stopped after the pointer is located in the second area.

In a further preferred embodiment of the device according to the first aspect of the invention, the fourth means notifies the user a fact that the pointer is moved from the second area to the first area across the boundary and a fact that the pointer is moved from the first area to the second area across the boundary in different ways from each other.

In a still further preferred embodiment of the device according to the first aspect of the invention, the first area is an area where a required item is displayed. A process to be executed in the device is assigned to the required item.

In a still further preferred embodiment of the device according to the first aspect of the invention, the fourth means notifies the user the fact that the pointer is moved across the boundary between the first area and the second area with sound.

In a still further preferred embodiment of the device according to the first aspect of the invention, the fourth means notifies the user the fact that the pointer is moved across the boundary between the first area and the second area with vibration.

In a still further preferred embodiment of the device according to the first aspect of the invention, the fourth means notifies the user the fact that the pointer is moved across the boundary between the first area and the second area with light.

A mobile radio device according to a second aspect of the present invention comprises:

first means for displaying on a screen an area where a required item is displayed, and a pointer;

the pointer being movable on the screen according to a user's operation;

second means for acquiring position information of the pointer on the screen;

third means for setting positional information of the area; and fourth means for notifying the user a fact that the pointer is moved on the screen across a boundary of the area based on the position information of the pointer acquired by the second means and the positional information of the area set by the third means.

With the portable radio device according to the second aspect of the present invention, there are provided with second means for acquiring position information of the pointer on the screen and third means for setting positional information of the area. Moreover, fourth means is provided for notifying the user a fact that the pointer is moved on the screen across a boundary of the area based on the position information of the pointer acquired by the second means and the positional information of the area set by the third means.

Therefore, the user can easily recognize whether the pointer is correctly located on the area or not by the notification operation of the forth means. This means that the operability of the device is improved with a simple configuration and that the pointing operation of the pointer to a desired area on the screen is facilitated.

In a preferred embodiment of the device according to the second aspect of the invention, the fourth means notifies the user a fact that the pointer is moved from an outside of the area to an inside of the area across the boundary or a fact that the pointer is moved from the inside of area to the outside thereof across the boundary.

In another preferred embodiment of the device according to the second aspect of the invention, the fourth means notifies the user a fact that the pointer is moved from an outside of the area to an inside thereof across the boundary and a fact that the pointer is moved from the inside of the area to the outside thereof across the boundary.

In still another preferred embodiment of the device according to the second aspect of the invention, when the pointer is moved from an outside of the area to an inside of the area across the boundary, the fourth means gives the user a notification that the pointer has been moved from the outside of the area to the inside of the area across the boundary. Moreover, the notification is continued until the pointer is moved from the inside of the area to the outside thereof across the boundary and is stopped after the pointer is located in the outside of the area.

In a further preferred embodiment of the device according to the second aspect of the invention, the fourth means notifies the user a fact that the pointer is moved from an outside of the area to an inside of the area across the boundary and a fact that the pointer is moved from the inside of the area to the outside thereof across the boundary in different ways from each other.

In a still further preferred embodiment of the device according to the second aspect of the invention, the fourth means notifies the user the fact that the pointer is moved across the boundary of the area with sound.

In a still further preferred embodiment of the device according to the second aspect of the invention, the fourth means notifies the user the fact that the pointer is moved across the boundary of the area with vibration.

In a still further preferred embodiment of the device according to the second aspect of the invention, the fourth means notifies the user the fact that the pointer is moved across the boundary of the area with light.

Additionally, in the mobile radio devices according to the first and second aspects of the present invention, any type of pointer may be used as the "pointer" if it can be used to point a desired place, area, icon, item, or the like, on a screen of a mobile radio device. For example, an arrow-, line-, or box-shaped pointer or cursor may be used for this purpose.

BRIEF DESCRIPTION OF THE DRAWINGS

In order that the present invention may be readily carried into effect, it will now be described with reference to the accompanying drawings.

FIG. 6 is a schematic diagram showing the exterior or appearance of the mobile radio devices according to the first, second, and third embodiments of the invention.

DETAILED DESCRIPTION OF THE PREFERRED EMBODIMENTS

Figure 1:
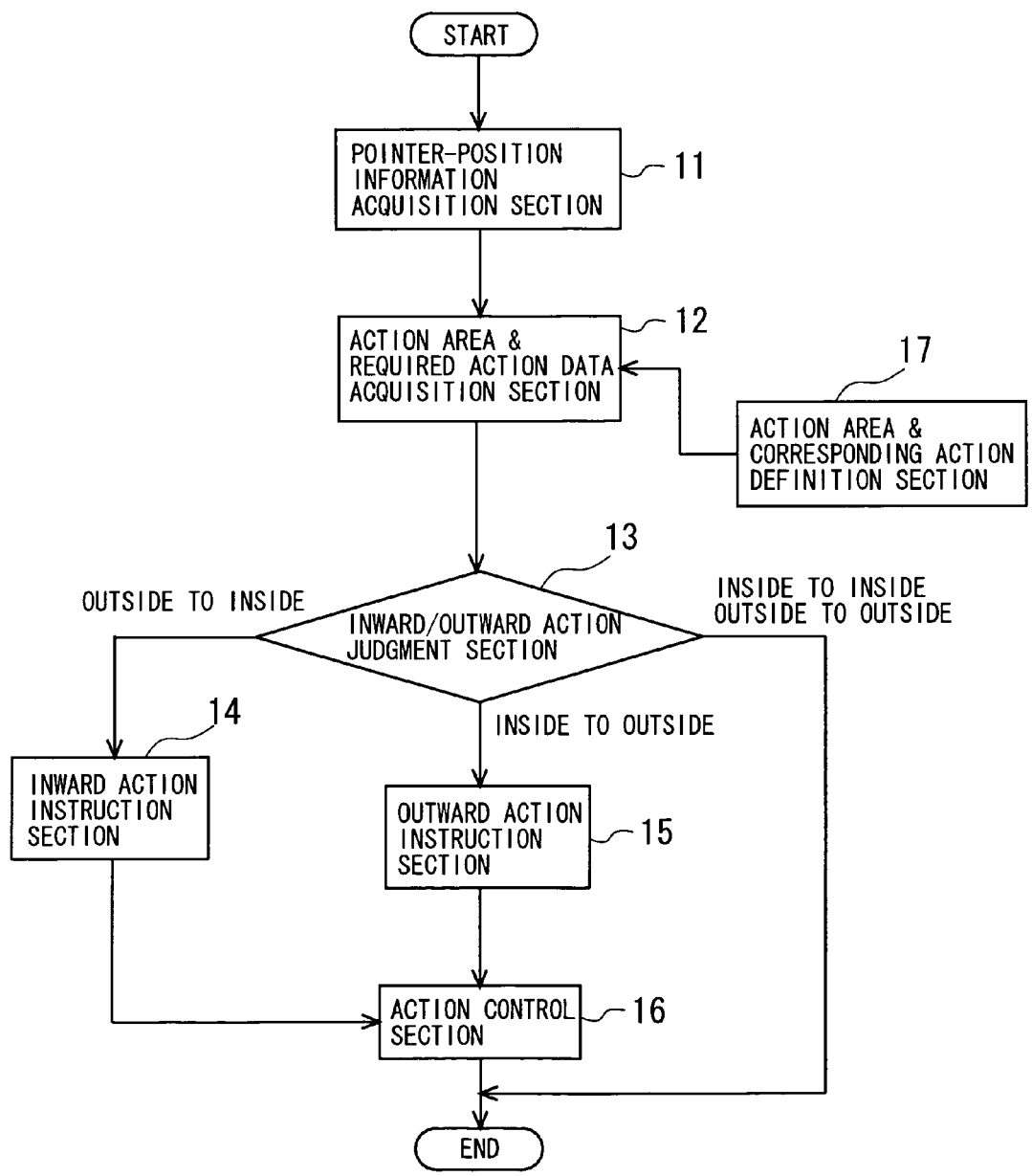
FIG. 1 is a schematic diagram showing the configuration and operation of the pointer action controller of the controller section in a mobile radio device according to a first embodiment of the invention.

Preferred embodiments of the present invention will be described in detail below while referring to the drawings attached.

First Embodiment

Figure 5:
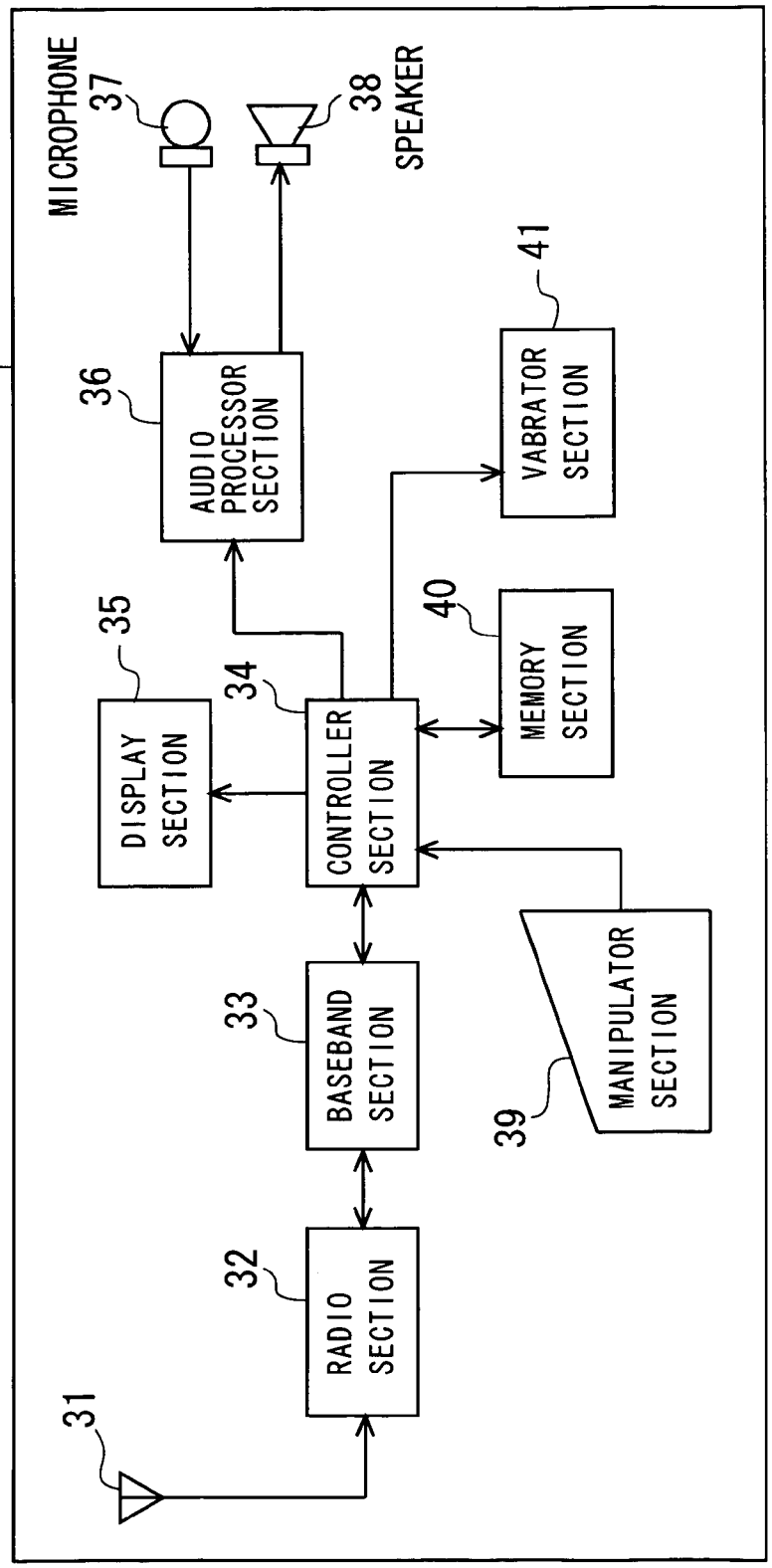
FIG. 5 is a functional block diagram showing the whole configuration of the mobile radio devices according to the first, second, and third embodiments of the invention.

A mobile radio device 10 according to a first embodiment of the invention is configured as a portable telephone terminal having a peculiar display control function along with an ordinary telephone function. As shown in FIG. 5, the device or terminal 10 comprises an antenna 31, a radio section 32, a baseband section 33, a controller section 34, a display section 35 with a rectangular screen, an audio processor section 36, a microphone 37, a speaker 38, a manipulator section 39, a memory section 40, and a vibrator section 41.

The radio section 32 is formed by a radio frequency (RE) transmission and reception circuit, which comprises a RF amplifier, a band-pass filter, and so on. The section 32 receives a signal transmitted from the outside by radio by way of the antenna 31 or transmits a desired signal generated in the section 32 to the outside by way of the antenna 31.

The baseband section 33 is formed by a circuit for processing baseband signals, which comprises a frequency synthesizer, a modulator/demodulator circuit, a TDMA(Time Division Multiple Access)/TDD (Time Dependent Duplex) control circuit, and so on.

The controller section 34 comprises a CPU (Central Processing Unit) having a ROM (Read-Only Memory) for storing a control program therein and a RAM (Random-Access Memory) used as a temporary memory region. The section 34 controls each element of the device 10 as necessary. In particular, the section 34 controls the movement of the pointer and the scroll of information displayed on the screen of the display section 35 according to the manipulation applied by the user by way of the manipulator section 39.

The display section 35 comprises a LCD (Liquid-Crystal Display) device that provides the above-described display screen.

The audio processor section 36 comprises an audio CODEC (COder-DECoder), an A(analog)/D(digital) converter circuit, a D(digital)/A(analog) converter circuit, and so on.

The manipulator section 39 comprises a set of manipulation buttons to be pressed by the user.

The memory section 40 comprises a rewritable nonvolatile memory, which is used for temporarily storing reception data, and for storing data (e.g., data for an electronic address book) registered by the user, and so on. The data stored in the section 40 is read out by the controller section 34 and displayed on the screen of the display section 35 according to the necessity.

FIG. 6 shows the appearance or exterior of the mobile communication terminal 10 according to the first embodiment of the invention. As shown in FIG. 6, the display screen of the display section 35, which is indicated by the reference numeral 351, is formed in the upper part of the front surface of the terminal 10. The manipulator section 39 is located in the lower part of the front surface of the terminal 10.

The section 39 includes a set of moving buttons 391 for scrolling the information displayed on the screen 351 and a set of input keys 392 for inputting numeric or characteristic data into the terminal 10. As the set of moving buttons 391, an upward moving button 3911, a leftward moving button 3912, a rightward moving button 3913, and a downward moving button 3914 are provided here. If the user presses one of the four buttons 3911 to 3914, the information displayed on the screen 351 is scrolled by a specific distance (e.g., a length for one dot) in a direction corresponding to the button pressed. The scrolling distance varies according to the time when the button is being pressed. As explained later, the set of the buttons 3911 to 3914 are used for moving the pointer on the screen 351 as well.

Not only necessary information for telephone conversation but also e-mail messages received, character and/or graphic data downloaded, telephone number-address lists registered, and so on, can be displayed on the screen 351.

Next, the operation of the mobile communication terminal 10 according to the first embodiment is explained below with reference to FIG. 1. FIG. 1 shows the configuration and operation the terminal 10 relating to the movement of the pointer.

The terminal 10 is designed in such a way that specific actions are carried out corresponding to the movement of the pointer on the screen 351. These specific actions are practically realized under the control of the control program stored in the controller section 34. The controller section 34 has a pointer action controller formed by the control program.

As shown in FIG. 1, the pointer action controller of the controller section 34 comprises a pointer-position information acquisition section 11, an action area & required action data acquisition section 12, an inward/outward action judgment section 13, an inward action instruction section 14, an outward action instruction section 15, an action control section 16, and an action area & corresponding action definition section 17.

The pointer-position information acquisition section 11 acquires the position information of the pointer displayed on the screen 351.

The action area & required action data acquisition section 12 acquires the position data of an action area (which corresponds to a first area) displayed on the screen 351 and the data of a required action corresponding to the said action area.

The inward/outward action judgment section 13 judges whether or not a movement of the pointer on the screen 351 from the inside of the action area to the outside thereof (which corresponds to a second area), or a movement of the pointer on the screen 351 from the outside of the action area to the inside thereof has been carried out.

The inward action instruction section 14 acquires the data of the action caused when the pointer is moved from the outside of the action area to its inside. Then, the section 14 instructs the action controller section 16 to execute a predetermined action corresponding to the said movement of the pointer.

The outward action instruction section 15 acquires the data of the action caused when the pointer is moved from the inside of the action area to its outside Then, the section 15 instructs the action controller section 16 to execute a predetermined action corresponding to the said movement of the pointer.

The action controller section 16 receives the instruction from the inward action instruction section 14 or the outward action instruction section 15, and controls the execution of the action thus instructed by the section 14 or 15.

The action area & corresponding action definition section 17 defines the action area on the screen 351 and its corresponding actions to be carried out according to the instruction from the inward or outward action instruction section 14 or 15.

Here, the "action area" is an area formed or displayed on the screen 351 where a predetermined action such as vibration, sound reproduction, rumbling, or the like is carried out if the pointer is placed correctly in the "action area". The "action area" is usually formed or defined in such a way as to have approximately the same position, size, and shape as those of an area for specifying or designating a desired telephone number from the list in the phone book, an area for creating and/or transmitting/replying e-mail messages, and an area for designating the location of a desired WWW server (i.e., the URL (Universal Resource Locator) of a desired site on the Internet), or the like. If the user chooses one of these areas and instructs the terminal 10 to execute the corresponding function to the area thus chosen, information processing is conducted in the terminal 10 according to the user's choice.

Next, the overall operation flow of the pointer action controller of the controller section 34 is explained below with reference to FIG. 1.

First, when the pointer is started to move on the screen 351, the pointer-position acquisition section 11 is called or activated Then, the section 11 acquires the position data of the pointer on the screen 351 and calls the action area & required action data acquisition section 12. Thereafter, the section 12 acquires the position data of the action area on the screen 351 and the data of corresponding actions to the said action area. The corresponding actions to the action area are defined in advance by the action area & corresponding action definition section 17. After acquiring the data of the action area and the corresponding actions, the section 12 calls the inward/outward action judgment section 13.

In response, the inward/outward action judgment section 13 judges whether or not the pointer has been moved from the inside of the action area to the outside thereof or moved from the outside of the action area to the inside thereof. If the pointer has been moved from the outside of the action area to the inside thereof, the section 13 calls the inward action instruction section 14, and transmits the action data corresponding to the action area in question to the section 14. On the other hand, if the pointer has been moved from the inside of the action area to the outside thereof, the section 13 calls the outward action instruction section 15, and transmits the action data corresponding to the action area in question to the section 15. If the pointer has been moved in the inside of the action or in the outside thereof, the operation flow is finished directly.

When the pointer has been moved from the outside of the action area to the inside thereof, the inward action instruction section 14 is called Thereafter, the section 14 acquires the action data corresponding to the said action of the pointer and then, instructs the action control section 16 to execute an action according to the said inward action of the pointer. On the other hand, when the pointer has been moved from the inside of the action area to the outside thereof, the outward action instruction section 15 is called. Thereafter, the section 15 acquires the action data corresponding to the said action of the pointer and then, instructs the action control section 16 to execute an action according to the said outward action of the pointer.

Finally, the action controller section 16 receives the action data transmitted from the inward action instruction section 14 or the outward action instruction section 15 and then, controls the execution of the action instructed by the section 14 or 15. Thereafter, the operation flow is completed.

Figure 2:
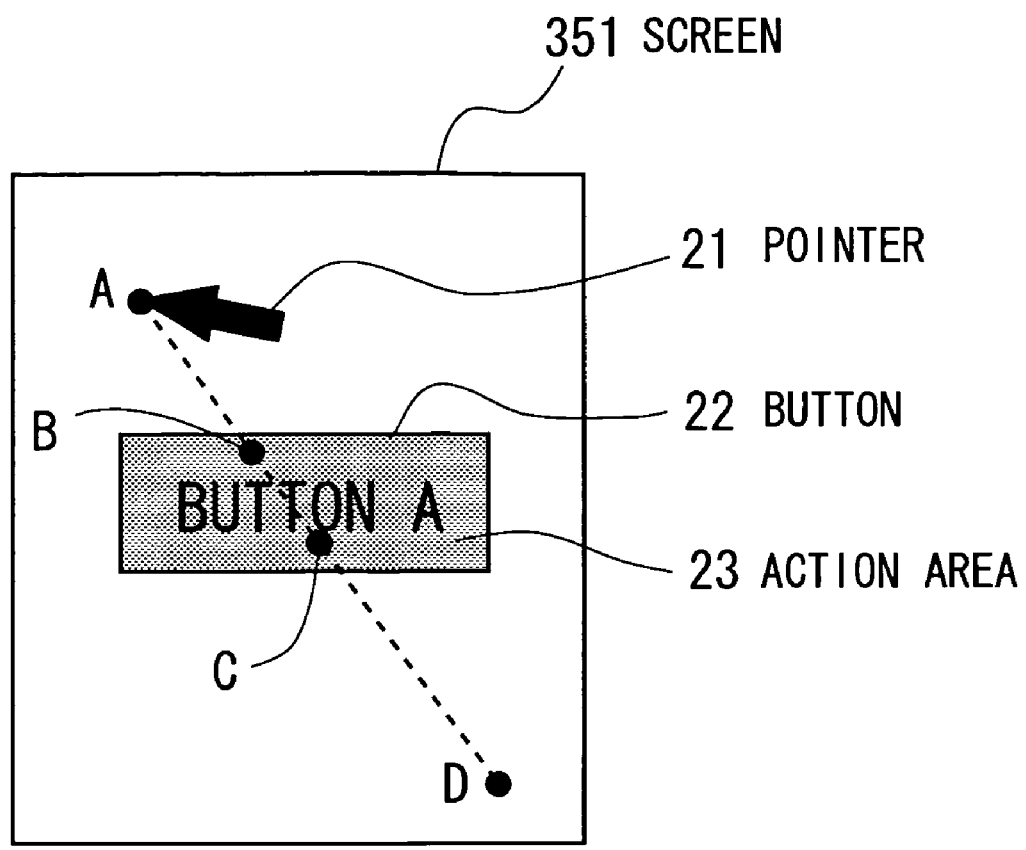
FIG. 2 is a schematic view of the displaying screen of the device according to the first embodiment of FIG. 1.

FIG. 2 schematically shows the displayed image of the screen 351 of the terminal 10 according to the first embodiment, where an arrow-shaped pointer 21, a rectangular button 22 labeled "BUTTON A", and a rectangular action area 23 are displayed and formed.

Here, the boundary of the action area 23 is in accordance with the contour or outline of the button 22, in other words, the action area 23 is entirely overlapped with the button 22. However, the boundary of the action area 23 may not be in accordance with the contour or outline of the button 22. The pointer 21 is formed to be movable on the whole screen 351 and used for choosing or pointing the button 22 and other buttons (not shown). The pointer 21 is designed in such a way as to be moved in all directions on the screen 351 by pressing the set of the moving buttons 391 provided for scrolling the displayed information on the screen. Specifically, when the user presses the upward or downward moving button 3911 or 3914, the pointer 21 is moved upwardly or downwardly from the current position, respectively. Similarly, when the user presses the rightward or leftward movement button 3912 or 3913, the pointer 21 is moved to the right or left from the current position, respectively. The moving distance of the pointer 21 varies according to the time when the button 3911, 3912, 3913, or 3914 is being pressed. By adjusting the pressing time of the button 3911, 3912, 3913, or 3914, the user can move the pointer 21 to his/her desired position on the screen 351 optionally.

If the user operates the buttons 3911, 3912, 3913, and 3914 in such a way as to locate the pointer 21 on the button 22 to thereby choose the same and then, presses an execution button (not shown), specific information processing that has been defined for the button 22 in advance is carried out. For example, if the function assigned to the button 22 is to make a phone call to a person whom the user chooses, the user can make a phone call to the person he/she has chosen from the list of the phone book. It the function assigned to the button 22 is to deal with e-mail, the user can create and transmit new e-mail messages, receive e-mail messages transmitted to the user, recall desired e-mail messages received for reply, and delete unnecessary e-mail messages received. If the function assigned to the button 22 is to read and/or view Internet sites, the user can optionally access desired sites on the Internet the user has chosen or designated in a known way.

Points A, B, C, and D shown in FIG. 2 are established for explanation of this embodiment. The points A and D are located at different positions outside the action area 23 and button 22, in other words, the points A and D do not overlap with the area 23 and the button 22. The points B and C are located at different positions in the action area 23 and the button 22, in other words, the points B and C are overlapped with the area 23 and the button 22.

Two specific actions are assigned to the action area 23. One of the actions assigned is to start a predetermined vibration of the terminal 10, which is carried out at the time when the pointer 21 is moved from the outside of the action area 23 to the inside thereof. The action to start the vibration of the terminal 10 is termed the "inward action". The other of the actions assigned is to stop the predetermined vibration of the terminal 10, which is carried out at the time when the pointer 21 is moved from the inside of the action area 23 to the outside thereof The action to stop the vibration of the terminal 10 is termed the "outward action".

Here, it is supposed that the pointer 21 is initially located at the point A and the, it is successively moved to the points B, C, and D. Moreover, it is supposed that the pointer 21 is moved straight from the point A to point B with a single action, from the point B to point C with a single action, and from the point C to point D with a single action.

When the pointer 21 is located at the point A, no action is started When the pointer 21 is moved from the point A to the point B, the inward/outward action judgment section 13 judges that the pointer 21 has been moved from the outside of the action area 23 to the inside thereof across the border of the area 23, in other words, the "inward action" of the pointer 21 has been conducted. Thereafter, the section 13 sends the inward action instruction section 14 an order to start the predetermined vibration operation of the terminal 10. In response to the order, the section 14 instructs the action control section 16 to control the execution of the "inward action". Under the control of the section 16, the vibration operation of the terminal 10 is started.

When the pointer 21 is moved from the point B to the point C, the pointer 21 has no action between the outside of the action area 23 and the inside thereof through the border of the area 23. Thus, no other action is caused and as a result, the vibration operation of the terminal 10 continues.

When the pointer 21 is moved from the point C to the point D, the inward/outward action judgment section 13 judges that the pointer 21 has been moved from the inside of the action area 23 to the outside thereof across the border of the area 23, in other words, the "outward action" of the pointer 21 has been carried out. Thereafter, the section 13 sends the outward action instruction section 15 an order to stop the predetermined vibration operation of the terminal 10. In response to the order, the section 15 instructs the action control section 16 to control the start of the "outward action". Under the control of the section 16, the vibration operation of the terminal 10 is stopped.

Accordingly, if the user wants to move the pointer 21 to the button 22, it is sufficient for the user to manipulate appropriately the set of the moving buttons 391 until the vibration operation of the terminal 10 starts and to stop the manipulation of the buttons 391 immediately after the vibration operation has been started. If the user mistakenly manipulates the pointer 21 and thus, the pointer 21 is passed through the button 22, the vibration operation is stopped when the pointer 21 is moved to the outside of the action area 23, i.e., the button 22. Therefore, the user can immediately recognize his/her manipulation operation as a mistake or not easily. As a result, the operability of the terminal 10 is improved; in other words, the terminal 10 can be operated more easily.

In the above-described first embodiment, the start of vibration of the terminal 10 is defined as the "inward action" while the stop of the same vibration is defined as the "outward action". However, reproduction of sound may be used for this purpose. Specifically, the start of reproduction of a sound may be defined as the "inward action" while the stop of the reproduction of the said sound may be defined as the "outward action". For example, to start reproduction of a predetermined, prolonged sound of "twee" is assigned to the "inward action", which is carried out at the time when the pointer 21 is moved from the outside of the action area 23 to the inside thereof. On the other hand, to stop the reproduction of the said predetermined sound is assigned to the "outward action", which is carried out at the time when the pointer 21 is moved from the inside of the action area 23 to the outside thereof.

In this case, if the user wants to move the pointer 21 to the button 22, it is sufficient for the user to manipulate the set of the moving buttons 391 until the reproduction operation of the sound of "twee" starts and to stop the manipulation of the buttons 391 immediately after the reproduction operation has started. If the user mistakenly manipulates the pointer 21 and thus, the pointer 21 is passed through the button 22, the sound-reproduction operation is stopped when the pointer 21 is moved to the outside of the action area 23 (i.e., the button 22) across the border of the area 23. Therefore, the user can immediately recognize his/her manipulation as a mistake or not easily. As a result, the operability of the terminal 10 is improved; in other words, the terminal 10 can be operated more easily.

Moreover, the start of reproduction of the sound A may be defined as the "inward action" while the start of reproduction of the sound B different from the sound A may be defined as the "outward action". In this case, if the user wants to move the pointer 21 to the button 22, it is sufficient for the user to manipulate the set of the moving buttons 391 until the reproduction operation of the sound A starts and to stop the manipulation of the buttons 391 immediately after the reproduction operation of the sound B has started. If the user mistakenly manipulates the pointer 21 and thus, the pointer 21 is passed through the button 22, the reproduced sound is changed from the sound A to the sound B when the pointer 21 is moved to the outside of the action area 23 (i.e., the button 22) across the border of the area 23. Therefore, the user can immediately recognize his/her manipulation as a mistake or not easily. As a result, the operability of the terminal 10 is improved; in other words, the terminal 10 can be operated more easily.

Furthermore, the following variation is applicable if the terminal 10 is designed in such a way as to cause its vibration in different ways. Specifically, the start of a vibration C may be defined as the "inward action" while the start of a vibration D different from the vibration C may be defined as the "outward action". In this case, if the user wants to move the pointer 21 to the button 22, it is sufficient for the user to manipulate the set of the moving buttons 391 until the vibration C starts and to stop the manipulation of the buttons 391 immediately after the vibration D has started. If the user mistakenly manipulates the pointer 21 and thus, the pointer 21 is passed through the button 22, the generated vibration is changed from the vibration C to the vibration D when the pointer 21 is moved to the outside of the action area 23. Therefore, the user can immediately recognize his/her manipulation as a mistake or not easily. As a result, the operability of the terminal 10 is improved; in other words, the terminal 10 can be operated more easily.

The same advantages are obtainable if vibration of the terminal 10 and reproduction of sound are combined together as the "inward action" and/or the "outward action". For example, the start of reproduction of a "sound" may be defined as the "inward action" while the start of a "vibration" may be defined as the "outward action". The start of a "vibration" may be defined as the "inward action" while the start of reproduction of a "sound" may be defined as the "outward action". The start of generation of a "vibration" and the reproduction of a "sound" may be combined together as the "inward action". In this case, the user can recognize more easily whether his/her manipulation of the moving buttons 391 is made correctly or not by way of existence/absence or change of the vibration of the terminal 10 and/or the reproduction of sound. Therefore, the operability or the terminal 10 is improved furthermore.

Second Embodiment

Figure 3:
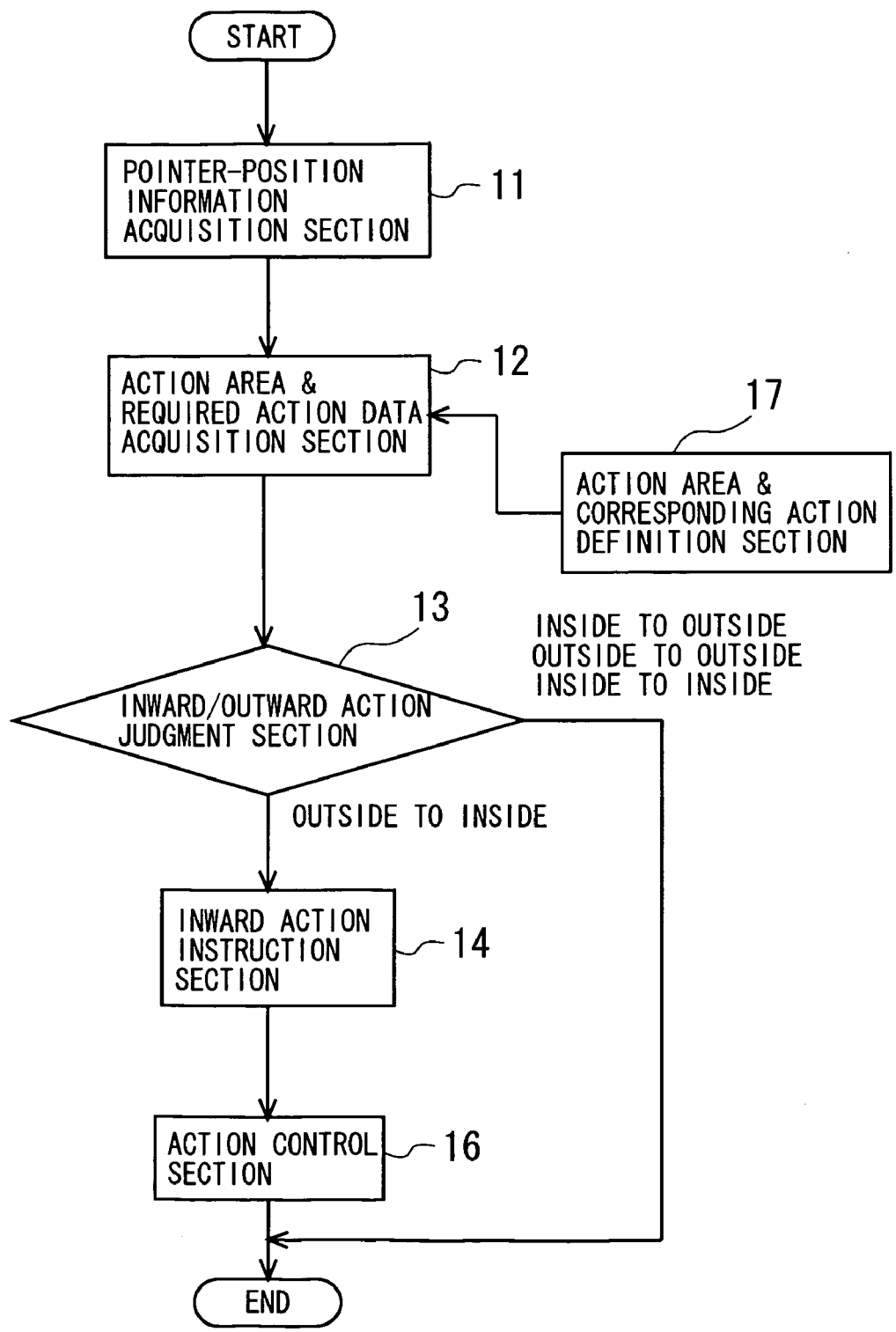
FIG. 3 is a schematic diagram showing the configuration and operation of the pointer action controller of the controller section in a mobile radio device according to a second embodiment of the invention.

FIG. 3 shows a mobile radio device according to a second embodiment of the invention, which is designed as a mobile telephone terminal like the first embodiment.

The terminal according to the second embodiment comprises the same configuration as the terminal 10 according to the first embodiment shown in FIGS. 1, 2, 5, and 6, except for the configuration and operation of the pointer action controller of the controller section 34, which is formed by a control program. Therefore, the detailed description about the same configuration and operation is omitted here for the sake of simplification of description.

As shown in FIG. 3, the pointer action controller comprises the pointer-position information acquisition section 11, the action area & required action data acquisition section 12, the inward/outward action judgment section 13, the inward action instruction section 14, the action controller section 16, and the action area & corresponding action definition section 17. The inward action instruction section 15 is not provided and therefore, the operation flow is completed directly if the pointer 21 is moved from the outside of the action area 23 (i.e., the button 22) to the inside thereof.

The pointer-position information acquisition section 11, the action area & required action data acquisition section 12, the inward/outward action judgment section 13, the inward action instruction section 14, the action controller section 16, and the action area & corresponding action definition section 17 are the same as those used in the first embodiment. Therefore, no explanations for them are provided here.

Since the outward action instruction section 15 is not provided, only the "inward action" is assigned to the action area 23. Here, the start of reproduction of a short sound "feep" or "beep" may be defined as the "inward action" while no action is defined as the "outward action".

Next, the overall operation flow of the pointer action controller of the mobile communication terminal according to the second embodiment is explained below with reference to FIGS. 2 and 3.

When the pointer 21 is located at the point A, no action is started. When the pointer 21 is moved from the point A to the point B, the inward/outward action judgment section 13 judges that the pointer 21 has been moved from the outside of the action area 23 to the inside thereof, in other words, the "inward action" of the pointer 21 has been made. Thereafter, the section 13 sends the inward action instruction section 14 an order to start the reproduction of the predetermined short sound "feep" or "beep". In response to the order, the section 14 instructs the action control section 16 to control the execution of the "inward action". Under the control of the section 16, the reproduction operation of the short sound "feep" or "beep" is carried out twice.

When the pointer 21 is moved from the point B to the point C, the pointer 21 has no action across the border of the action area 23. Thus, no action is caused.

When the pointer 21 is moved from the point C to the point A, the inward/outward action judgment section 13 judges that the pointer 21 has been moved from the inside of the action area 23 to the outside thereof, in other words, the "outward action" of the pointer 21 has been conducted. In this embodiment, the outward action instruction section 15 is not provided and no action is defined as the "outward action". Thus, no action or operation is conducted at this stage.

Accordingly, if the user wants to move the pointer 21 to the button 22, it is sufficient for the user to manipulate the set of the moving buttons 391 until the reproduction operation of the predetermined sound starts and to stop the manipulation of the buttons 391 immediately after the reproduction operation has started. Therefore, the user can immediately recognize his/her manipulation as a mistake or not easily. As a result, the operability of the terminal is improved like the first embodiment; in other words, the terminal 10 can be operated more easily.

In the above-described second embodiment, the start of reproduction of the predetermined short sound is defined as the "inward action" while no operation is defined as the "outward action". However, vibration of the terminal or reproduction of a prolonged sound as used in the above-described first embodiment may be used as the "inward action". Vibration of the terminal and reproduction of a sound may be simultaneously used for this purpose. In this case, the same advantages as those in the first embodiment are obtainable.

Third Embodiment

Figure 4:
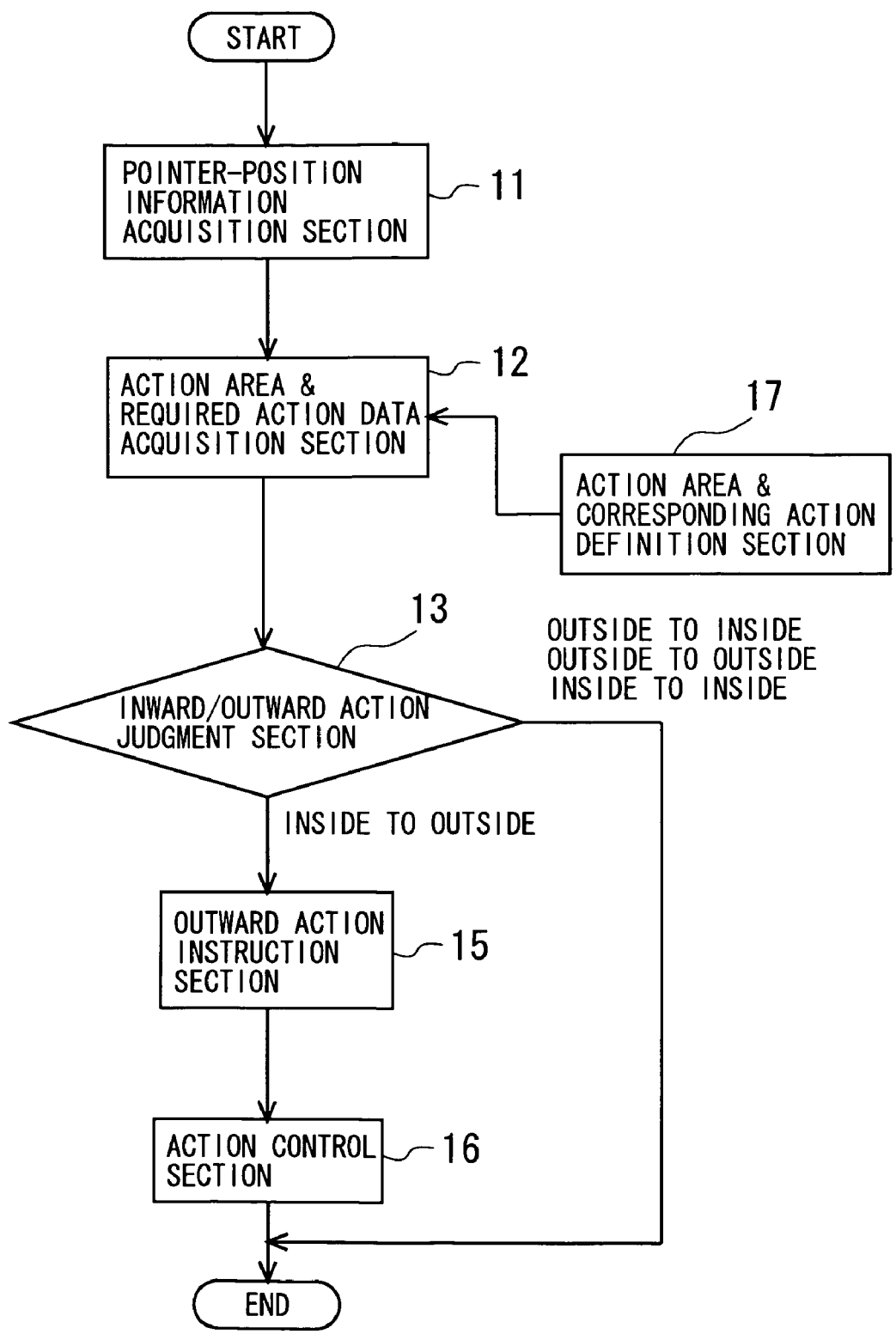
FIG. 4 is a schematic diagram showing the configuration and operation of the pointer action controller of the controller section in a mobile radio device according to a third embodiment of the invention.

FIG. 4 shows a mobile radio device according to a third embodiment of the invention, which is designed as a mobile telephone terminal like the first and second embodiments.

The terminal according to the third embodiment comprises the same configuration as the terminal 10 according to the first embodiment shown in FIGS. 1, 2, 5, and 6, except for the configuration and operation of the pointer action controller of the controller section 34, which is formed by a control program. Therefore, the detailed description about the same configuration and operation is omitted here for the sake of simplification of description.

As shown in FIG. 4, the pointer action controller comprises the pointer-position information acquisition section 11, the action area & required action data acquisition section 12, the inward/outward action judgment section 13, the outward action instruction section 15, the action controller section 16, and the action area & corresponding action definition section 17. The inward action instruction section 14 is not provided and therefore, the operation flow is completed directly if the pointer 21 is moved from the outside of the action area 23 (i.e., the button 22) to the inside thereof.

The pointer-position information acquisition section 11, the action area & required action data acquisition section 12, the inward/outward action judgment section 13, the outward action instruction section 15, the action controller section 16, and the action area & corresponding action definition section 17 are the same as those used in the first embodiment. Therefore, no explanations for them are provided here.

Since the inward action instruction section 14 is not provided, only the "outward action" is assigned to the action area 23. Here, the start of reproduction of a short sound "feep" or "beep" may be defined as the "outward action" while no action is defined as the "inward action".

Next, the overall operation flow of the pointer action controller of the mobile communication terminal according to the third embodiment is explained below with reference to FIGS. 2 and 4.

When the pointer 21 is located at the point A, no action is started. When the pointer 21 is moved from the point A to the point B, the inward/outward action judgment section 13 judges that the pointer 21 has been moved from the outside of the action area 23 to the inside thereof, in other words, the "inward action" of the pointer 21 has been conducted. Since the inward action instruction section 14 is not provided and no action is defined as the "inward action", no action or operation is conducted at this stage.

When the pointer 21 is moved from the point B to the point C, the pointer 21 has no action across the border of the action area 23. Thus, no action is caused.

When the pointer 21 is moved from the point C to the point D, the inward/outward action judgment section 13 judges that the pointer 21 has been moved from the inside of the action area 23 to the outside thereof, in other words, the "outward action" of the pointer 21 has been conducted. Thereafter, the section 13 sends the outward action instruction section 15 an order to conduct the predetermined vibration operation of the terminal 10. In response to the order, the section 15 instructs the action control section 16 to control the execution of the "outward action". Under the control of the section 16, the reproduction operation of the short sound "feep" or "beep" is carried out twice.

Accordingly, if the user wants to move the pointer 21 to the button 22, it is sufficient for the user to manipulate the set of the moving buttons 391 in such a way that the reproduction operation of the predetermined sound does not start. Therefore, the user can immediately recognize his/her manipulation as a mistake or not easily by way of hearing the sound "feep" or "beep". As a result, the operability of the terminal is improved like the first and second embodiments; in other words, the terminal can be operated more easily.

In the above-described third embodiment, the start of reproduction of the predetermined short sound is defined as the "outward action" while no operation is defined as the "inward action". However, in the same way as the second embodiment, vibration of the terminal or reproduction of another sound may be used as the "outward action". Vibration of the terminal and reproduction of a sound may be simultaneously used for this purpose. In this case, the same advantages as those in the first embodiment are obtainable.

Other Embodiments

It is needless to say that the invention is not limited to the above-described first to third embodiments. In the above-described first to third embodiments, reproduction of a sound or sounds and/or generation of a vibration or vibrations are assigned to the "inward action" and/or the "outward action", respectively. However, the invention is not limited to these examples. Approximately the same advantages are obtainable if any other action is assigned to the "inward action" and/or the "outward action".

For example, emission of visible light from the screen 351 may be employed for this purpose, which can be realized by using a known technique, for example, by changing the intensity of the emitted light from the screen 351. Emission of visible light from the screen 351 may be used solely or combined to reproduction of a sound or sounds and/or generation of a vibration or vibrations. In the case where emission of visible light, reproduction of a sound or sounds, and generation of a vibration or vibrations are combined together, the count of ways to confirm or recognize whether the choice of the button 22 is correct or not is increased. Therefore, the operability of the terminal or device is improved furthermore. Additionally, there is an additional advantage that the improved operability does not degrade even if the terminal or device is located in a place where the information on the screen 351 is hard to make out with naked eyes.

As the sound for the "outward action" and/or the "inward action", a specific "melody" may be used. A melody may be used solely or combined to a short sound "feep" or "beep" or a prolonged sound "twee" The sound reproduction or vibration may be automatically finished after a predetermined constant period has passed, or may continue until corresponding information processing is executed or other action is carried out. In these cases, the same advantage is obtainable.

Figure 7A:
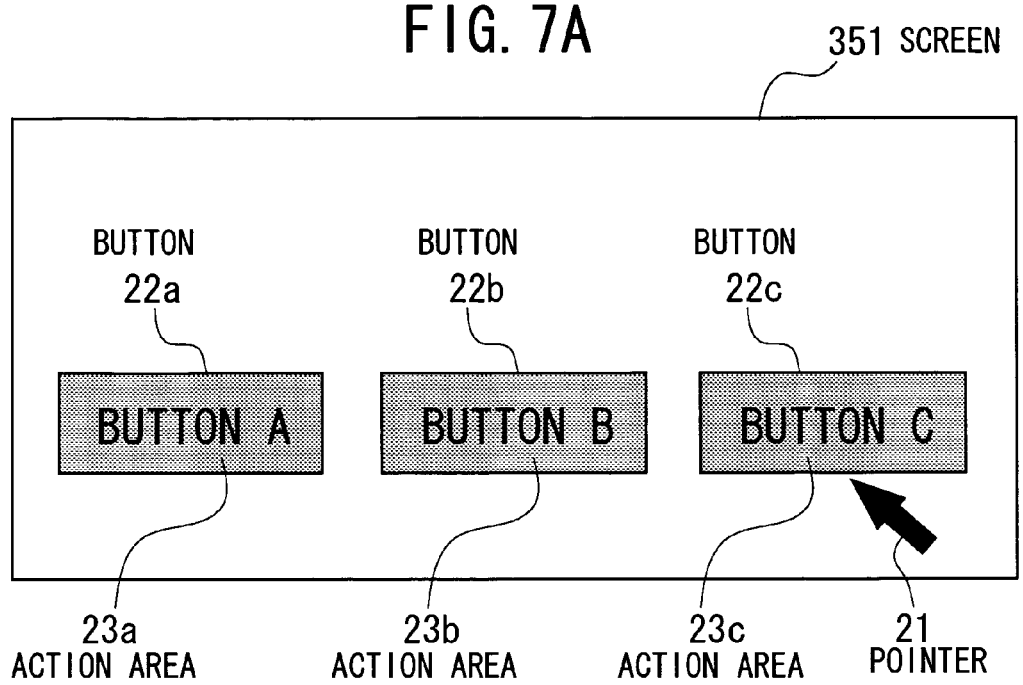
FIGS. 7A and 7B are schematic views showing the displayed images on the displaying screen of mobile radio devices according to other embodiments of the invention, respectively.

Additionally, although the single button 22 is displayed on the screen 351 in the first to third embodiments, a plurality of buttons may be simultaneously displayed on the screen 351, as shown in FIG. 7A. In the example of FIG. 7A, three buttons 22a, 22b, and 22c and three action areas 23a, 23b, and 23c are displayed on the screen 351. The action areas 23a, 23b, and 23c are formed in such a way as to be entirely overlapped with the buttons 22a, 22b, and 22c, respectively. In this case, an additional advantage that the range of selectable information is expanded is obtainable.

In the above-described first to third embodiments, the object of moving the pointer 21 is to choose the window of designating a person the user wants to make a phone call, dealing e-mail, or designating the Internet site. However, moving of the pointer 21 may be used for any other purposes. For example, it may be used for operating a game on the screen 351, or designating a desired location or point on a map displayed on the screen 351. It may be used for selecting each function built in the terminal or device in the menu displayed on the screen 351.

When a plurality of buttons is simultaneously displayed on the screen 351, different actions or functions may be assigned to the respective buttons. For example, "phone book", "e-mail", "WWW browser", "game", various information, "additional services", and so on, may be simultaneously displayed in the menu on the screen 351. In this case, different sounds may be assigned to the respective buttons. Sounds used for a part of the buttons may be different while sounds used for the remainder may be the same.

A specific sound may be assigned to each of the buttons in such a way as to suggest or denote the content of information processing corresponding to the button. For example, if the pointer 21 is moved to the inside of the button 22 (i.e., the action area 23) labeled "phone book", a voice of "phone book" or "to make a phone call" may be reproduced. In this case, the user's choice S about the buttons can be easily recognized and as a result, the operability of the terminal is improved furthermore.

If the pointer 21 is moved to the inside of the button 22 (i.e., the action area 23) labeled "creating e-mail", "replying e-mail", or "deleting e-mail", it is preferred to reproduce a voice of "to make an e-mail message", "to reply an e-mail message to Mr. or Ms. A", or "to delete an e-mail message designated", respectively. Similarly, if a recipient of a phone call is designated, a voice pronouncing the name of the recipient or the like may be reproduced. For example, a voice of "to make a phone call to Mr. or Ms. B" or "to communicate with the C company" may be reproduced. If the pointer 21 is used to designate a desired location on a map on the screen 351, a voice pronouncing the name of the location may be reproduced. If the pointer 21 is used to designate a URL of a desired Internet site, a voice of "to access the site or homepage of D" or "to display the information at the site or homepage of E" may be reproduced. In this way, it is preferred to reproduce an appropriate voice denoting the content of the information processing corresponding to the button 22. In these cases, the user's choice about the buttons or the contents of the information to be processed can be easily recognized and as a result, the operability of the terminal is improved furthermore.

Figure 7B:
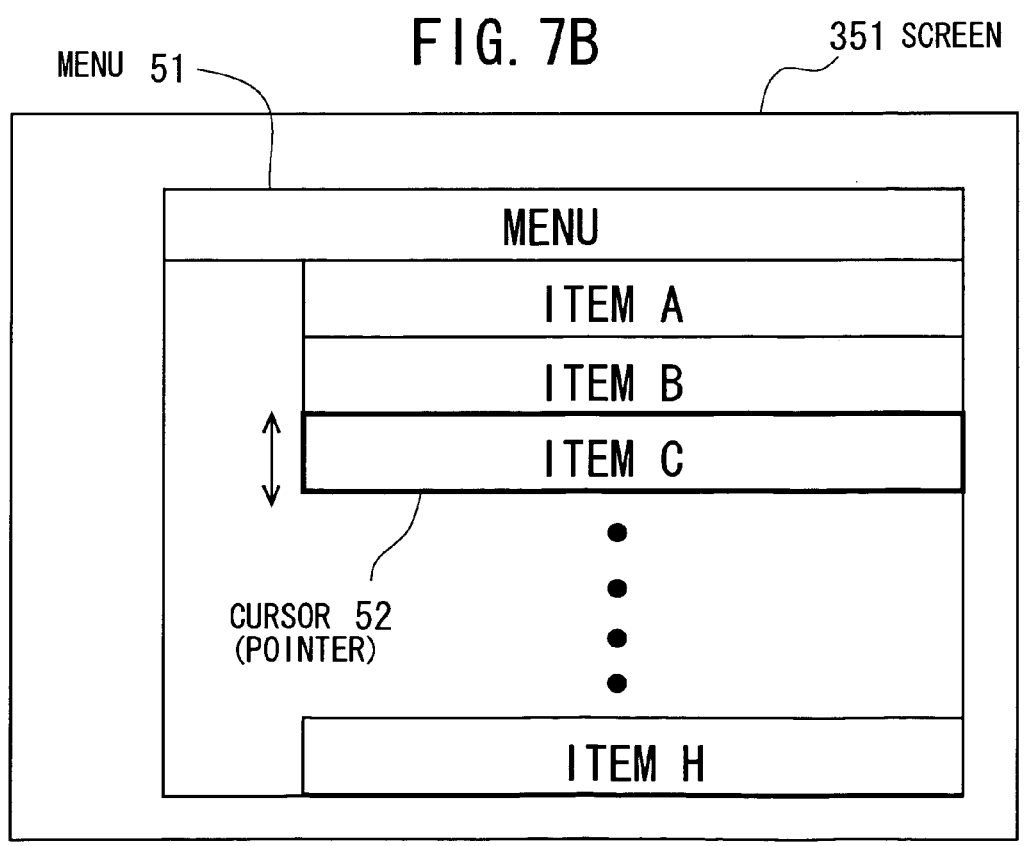

In the above-described embodiments, the pointing device is formed by the set of the moving buttons 3911, 3912, 3913, and 3914. However, any other pointing device such as a touch-pad, trackball, a joystick, or a set of buttons for bi-directional movements may be used for this purpose. In this case, there is an additional advantage that the operability of the pointer itself is improved. Additionally, a "cursor" designed for only choosing one of the information processing items displayed on the screen 351 may be used instead of the arrow-shaped pointer 21, where the movable range of the cursor is limited in the items thus listed, as shown in FIG. 7B. In the example of FIG. 7B, a menu 51 including selectable eight items (i.e., item a to item h) is displayed on the screen 351 and at the same time, a rectangular cursor 52 (which serves as the above-described pointer) is displayed. The cursor 52 is movable in the menu 51 and used to choose one of the eight items When the cursor 52 is moved across the boundary of the adjoining items, a notification operation using vibration, sound, and/or light is carried out for the user. This is similar to the above-described first to third embodiments. In this case, the same advantages as those of the above-described embodiments are obtainable.

Although the above-described mobile radio devices of the first to third embodiments are designed as a mobile telephone terminal, they may be designed as a terminal for so-called PHS (Personal Handyphone System).

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A mobile radio device comprising:
first means for displaying a first area, a second area, and a pointer on a screen;
the second area being partitioned by a boundary and located outside the first area, wherein the boundary separates the first area from the second area and the boundary is separate from both the first and second areas, and wherein the first area is an area within an icon;
the pointer being movable on the screen according to a user's operation;
second means for acquiring position information of the pointer on the screen;
third means for setting positional information of the first area and the second area; and
fourth means for notifying the user only when the pointer is moved on the screen across the boundary between the first area and the second area based on the position information of the pointer acquired by the second means and the positional information of the first area and the second area set by the third means,
wherein when the pointer is moved from the second area to the first area across the boundary, the fourth means gives the user a first notification, which indicates that the pointer has been moved from the second area to the first area across the boundary,
wherein the fourth means gives the user a second notification, which indicates that the pointer is moved from the first area to the second area across the boundary and the second notification is different than the first notification, and
wherein the first and second notifications are vibrations.

2. The device according to claim 1, wherein a required item is displayed in the first area;
and wherein a process to be executed in the device is assigned to the required item.

3. The device according to claim 1, wherein the fourth means notifies the user the fact that the pointer is moved across the boundary between the first area and the second area with sound.

4. The device according to claim 1, wherein the fourth means notifies the user the fact that the pointer is moved across the boundary between the first area and the second area with light.

5. The device according to claim 1, wherein the first means displays a plurality of first areas, and different selection sounds are generated for respective first areas of the plurality of first areas.

6. The device according to claim 5, wherein the selection sounds include different voice messages assigned to the respective first areas of the plurality of first areas and each of the voice messages indicates a content of information processing corresponding to each of the respective first areas of the plurality of first areas.

7. A mobile radio device comprising:
a display screen having a first area and a second area outside the first area, wherein the second area is partitioned by a boundary, wherein the boundary separates the first area from the second area and the boundary is separate from both the first and second areas, and wherein the first area is an area within an icon;
a pointer movable throughout the screen according to a user's operation;
a pointer positioning unit which determines a position of the pointer;
an area positioning unit which determines positions of the first and second areas; and
a notification unit which provides a first notification to the user only when the pointer moves across the boundary from the first area to the second area based on the position of the pointer and the positions of the first and second areas,
wherein when the pointer moves across the boundary from the second area to the first area the notification unit provides a second notification to the user,
wherein the first notification continues until the pointer moves across the boundary from the first area to the second area,
wherein the second notification is different than the first notification, and
wherein the first and second notifications are vibrations.

8. The device according to claim 7, wherein the notification unit notifies the user with sound when the pointer moves across the boundary.

9. The device according to claim 7, wherein the notification unit notifies the user with light when the pointer moves across the boundary.

10. A mobile radio device comprising:
a mobile radio display screen having an action area and a non-action area outside the action area, wherein the action area is an area within an icon; and
a pointer which is movable throughout the display screen according to a user's operation,
wherein a boundary exists between the action area and a non-action area and the boundary is separate from both the action area and the non-action area, and
wherein the user is provided with a first notification only when the pointer is moved on the display screen across the boundary from the action area to the non-action area,
wherein the user is provided with a second notification only when the pointer is moved on the display screen across the boundary from the non-action area to the action area,
wherein the second notification is different than the first notification, and
wherein the first and second notifications are vibrations.

11. The mobile radio device according to claim 10, further comprising a pointer movement apparatus that includes a joystick.

12. The mobile radio device according to claim 10, further comprising a pointer movement apparatus that includes a touchpad.

13. The mobile radio device according to claim 10, further comprising a pointer movement apparatus that includes a trackball.

14. The mobile radio device according to claim 10, further comprising a pointer movement apparatus that includes a set of buttons.

* * * * *